(12) United States Patent
Asher

(10) Patent No.: US 7,626,496 B1
(45) Date of Patent: Dec. 1, 2009

(54) NEGATIVE FEEDBACK LOOP FOR DEFECT MANAGEMENT OF PLANT PROTECTION TICKET SCREENING

(75) Inventor: Michael L. Asher, Green Grove Springs, FL (US)

(73) Assignee: AT&T Corp., New York, NY (US)

( * ) Notice: Subject to any disclaimer, the term of this patent is extended or adjusted under 35 U.S.C. 154(b) by 565 days.

(21) Appl. No.: 11/653,613

(22) Filed: Jan. 16, 2007

(51) Int. Cl.
*G08B 1/00* (2006.01)
(52) U.S. Cl. ............... 340/531; 340/538; 340/286.01; 340/286.02; 340/286.14; 702/5; 707/3; 715/734
(58) Field of Classification Search ........... 340/531, 340/538, 539.13, 995.1, 286.01, 286.02, 340/286.14; 702/5, 6; 707/1, 3, 10; 709/223; 715/734, 853
See application file for complete search history.

(56) References Cited

U.S. PATENT DOCUMENTS

| | | | |
|---|---|---|---|
| 6,421,725 B1 * | 7/2002 | Vermilyea et al. | 709/224 |
| 6,748,340 B2 * | 6/2004 | Otsuki et al. | 702/150 |
| 7,207,012 B1 * | 4/2007 | House et al. | 715/853 |
| 2006/0085396 A1 * | 4/2006 | Evans et al. | 707/3 |
| 2008/0021863 A1 * | 1/2008 | Evans et al. | 707/1 |

* cited by examiner

*Primary Examiner*—Davetta W Goins

(57) ABSTRACT

This is a method for use in automated screening of tickets for plant protection based on negative feedback from past performance. In particular this invention provides an automated screening process that takes a dig ticket address from a ticket request and correlates it to known cable locations to determine which ticket dig addresses are too close to the buried fiber. This is done using a method that balances the risk of extra labor charges due to a Type I error with the risk of costs associated with a cable cut due to a Type II error.

20 Claims, 3 Drawing Sheets

NEGATIVE FEEDBACK LOOP FOR DEFECT MANAGEMENT OF PLANT PROTECTION TICKET SCREENING

FIELD OF THE INVENTION

The present invention relates generally to the protection of fiber optic cables or other underground plant assets during maintenance and other activities taking place in the area of the underground assets. More particularly, the present application relates to automatically screening dig requests in the "dig tickets" database for tickets likely to be a threat to a cable, by correlating the ticket to known cable locations to determine which ticket repair locations are too close to a buried fiber.

BACKGROUND OF THE INVENTION

The protection of buried assets, such as fiber optic cables, from damage is of paramount concern to the telecommunications company that owns the cables. The primary cause of damage is nearby construction activity unrelated to the cable and its maintenance. This may include digging or excavation for new building construction, boring, maintenance or installation activities by contractors for other utilities, etc.

The National "Call Before You Dig" program is an important aspect in the protection process. This protection process starts with a contractor calling in to the National "Call Before You Dig" call center to report the need to dig at a location. Then the National "Call Before You Dig" call center records the information from the caller. The National "Call Before You Dig" center sends all recorded dig request activity tickets or alerts to all subscribing underground utility providers. Because of the large number of calls received by the center, a national utility such as a telecommunications company may handle several million "dig tickets" or dig requests per year. Each ticket indicates a potentially damaging dig activity, which may be near a cable asset.

Due to this immense ticket volume, most utility companies screen at least a portion of these tickets via automatic means. Each "dig ticket" contains information used to determine a longitude/latitude location for the dig activity, and this location is matched against locations of existing cable assets held within a GIS (geographic information system) application.

This process is known as automatic screening or "auto-screening" and is inherently unreliable. This process may produce two types of errors. A Type I error occurs when a ticket is incorrectly deemed "involved" when that ticket is not dangerously close to a fiber cable location. As used herein, a ticket is deemed "involved" if it is identified as a risk to cable assets. A dig activity at this location would not result in cable damage, but the incorrect suspicion of potential damage does result in additional labor costs from following up on a misclassified ticket and the unnecessary field inspection to keep an already safe cable site safe. A Type II error occurs when a ticket that should be flagged as a problem ("involved") is instead classified as not a problem. A Type II error is also known as a false negative. This incorrect assignment of "Not Involved" is also called a "screening defect" and generates risk of cable damage from not monitoring a dig activity that is too close to a fiber cable.

It has been found that the reliability of screening dig tickets varies with the geographic location of the ticket. In other words, there is a significant degree of geographic correlation to screening unreliability. The correlation is believed to be based on several factors. Street-level databases are less accurate in some areas so coordinates derived from addresses in those areas may be less accurate. Labels and markings may be inconsistent from one particular local to the next. For example, states and counties may use different nomenclature schemes. The regional Call Centers themselves may introduce errors, so that certain Call Centers may be less reliable than others at accurately capturing ticket location data.

The current procedure for screening dig activity tickets introduces errors that add cost to the overall process. This invention overcomes these issues and provides an automated screening process that takes dig locations from ticket requests and correlates them to known cable locations to determine which ticket dig locations are too close to buried fiber cable. This is done using a method that balances the risk of extra labor charges due to a Type I error with the risk of costs associated with a cable cut due to a Type II error.

SUMMARY OF THE INVENTION

The present invention addresses the needs described above by providing a method for automatically screening the "dig tickets" database for tickets likely to be a threat to a cable. One embodiment is a method for screening dig request alerts in an underground plant protection system, to identify involved dig requests. The method comprising the steps of collecting historical error data containing dig request screening errors and containing geographical locations of those errors; receiving a dig request alert containing location information of a planned excavation; determining a bounded zone containing locations satisfying the location information; scaling the bounded zone based on the historical error data that contains geographical locations in a same geographical region as the dig request location information; and if the scaled bounded zone overlaps an underground plant buffer zone, then identifying the dig alert as involved.

The step of collecting historical error data may also include associating each screening error with one of a plurality of geographical regions; and incrementing a counter associated with the one geographical region.

The geographical regions in that method may be delineated by a rectangular grid.

The step of collecting historical error data may also include determining whether each screening error is a Type I error or a Type II error; and the counter may also be associated with the determined error type.

The method may further comprise the step of scaling the bounded zone using predetermined weighting coefficients to assign relative weights to counter values for Type I and Type II errors.

The step of scaling the bounded zone may also include determining a scaling factor $$1 + \frac{1}{n}\sum_{k=1}^{n}(c_2 E_2(k) - c_1 E_1(k))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, and $E_2(k)$ is a value of the counter for Type II errors for geographical region k; and scaling the bounded zone using the scaling factor.

The step of scaling the bounded zone may further include using predetermined thresholds to assign minimum values for Type I and Type II error counts below which such errors are not considered.

The step of scaling the bounded zone further may further include determining a scaling factor $$1 + \frac{1}{n}\sum_{k=1}^{n}(c_2 \max(E_2(k) - t_2, 0) - c_1(E_1(k) - t_1, 0))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, $E_2(k)$ is a value of the counter for Type II errors for geographical region k; $t_1$ is a threshold value for the Type I error counter, and $t_2$ is a threshold value for the Type II error counter; and scaling the bounded zone using the scaling factor.

The step of determining from the location information a bounded zone in which the planned excavation lies, may further include converting the location information into a point having geographical coordinates; and constructing a box surrounding the point, the box containing possible locations of the point that satisfy the location information.

The step of identifying the dig alert as involved, may further include generating an alarm identifying the dig request alert.

Another embodiment of the invention is a computer-usable medium having computer readable instructions stored thereon for execution by a processor to perform a method for screening dig request alerts in an underground plant protection system, to identify involved dig requests. The method comprises the steps of collecting historical error data containing dig request screening errors and containing geographical locations of those errors; receiving a dig request alert containing location information of a planned excavation; determining a bounded zone containing locations satisfying the location information; scaling the bounded zone based on the historical error data that contains geographical locations in a same geographical region as the dig request location information; and if the scaled bounded zone overlaps an underground plant buffer zone, then identifying the dig alert as involved.

The computer-usable medium step of collecting historical error data may further include associating each screening error with one of a plurality of geographical regions; and incrementing a counter associated with the one geographical region.

The computer-usable medium geographical regions may be further delineated by a rectangular grid.

The computer-usable medium step of collecting historical error data may include determining whether each screening error is a Type I error or a Type II error; and in that case, may further include the counter associated with the determined error type.

The computer-usable medium step of scaling the bounded zone may further include using predetermined weighting coefficients to assign relative weights to counter values for Type I and Type II errors.

The computer-usable medium step of scaling the bounded zone may further include determining a scaling factor $$1 + \frac{1}{n}\sum_{k=1}^{n}(c_2 E_2(k) - c_1 E_1(k))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, and $E_2(k)$ is a value of the counter for Type II errors for geographical region k; and scaling the bounded zone using the scaling factor.

The computer-usable step of scaling the bounded zone may further include using predetermined thresholds to assign minimum values for Type I and Type II error counts below which such errors are not considered.

The computer-usable medium step of scaling the bounded zone may further include determining a scaling factor $$1 + \frac{1}{n}\sum_{k=1}^{n}(c_2 \max(E_2(k) - t_2, 0) - c_1(E_1(k) - t_1, 0))$$

wherein n is a number of geographical regions overlapped by the bounded zone, $c_1$ is a weighting coefficient for Type I errors, $c_2$ is a weighting coefficient for Type II errors, $E1_{(k)}$ is a value of the counter for Type I errors for geographical region k, $E_2(k)$ is a value of the counter for Type II errors for geographical region k; $t_1$ is a threshold value for the Type I error counter, and $t_2$ is a threshold value for the Type II error counter; and scaling the bounded zone using the scaling factor.

The computer-usable medium step of determining from the location information a bounded zone in which the planned excavation lies, may further include converting the location information into a point having geographical coordinates; and constructing a box surrounding the point, the box containing possible locations of the point that satisfy the location information.

The computer-usable medium step of identifying the dig alert as involved, may further include generating an alarm identifying the dig request alert.

DESCRIPTION OF THE INVENTION

The inventors have developed a method using negative feedback for managing automated ticket screening to reduce the occurrences of improperly screened tickets. The method is used in a system that includes a bidirectional feed from the GIS (geographic information system) "auto-screening" application, and further utilizes input from field service personnel responsible for supporting tickets.

Figure 1:
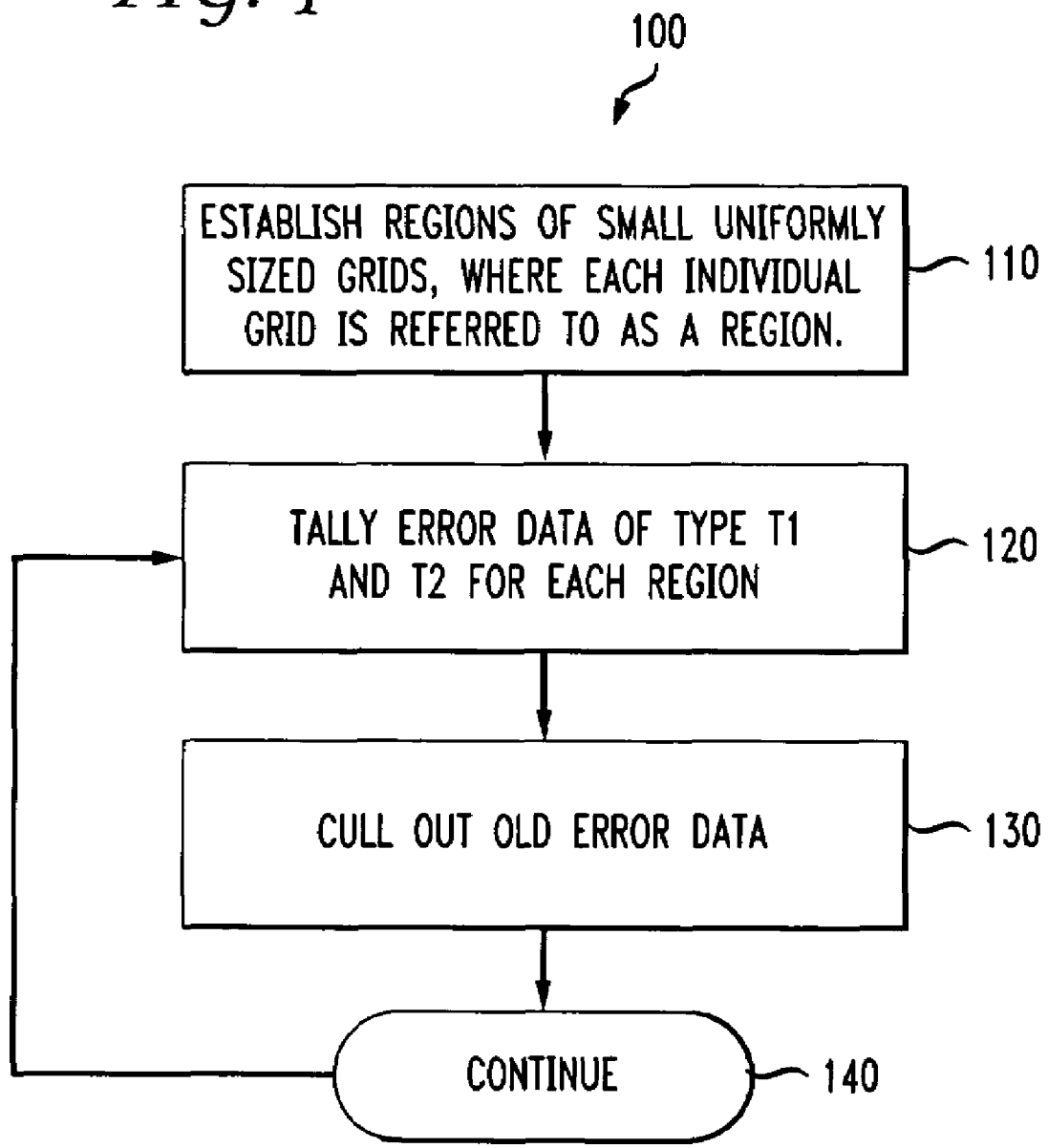
FIG. 1 is a flow chart depicting a process of error collection for each region, according to one embodiment of the invention.

A flow chart 100 depicting error gathering per region, according to one embodiment of the invention, is shown in FIG. 1. Regions are initially established (step 110) across the relevant areas. For example, in the case of a national telecommunications company, regions are established across the country. In one embodiment of this invention, a region is a small uniformly-sized area demarked by lines in a grid pattern

350 (FIG. 3); there may be on the order of several hundred grids per county. Other relevant geographic areas may be defined for other embodiments such as municipalities, political boundaries, or zones related to the relevant network.

Records of Type I and Type II errors are initially collected. That data must be gathered after each dig ticket is classified as "involved" or "not involved" with regard to causing risk to the buried assets; and after the work requiring the dig ticket is performed. After the work is performed the dig tickets are evaluated for errors. Improper classification of a ticket can result in either a Type I error or a Type II error. As noted above, a Type I error is a false positive, and a Type II error is a false negative. Based on the dig location on the responsible ticket, the error increments (step 120) a counter corresponding to the appropriate grid cell. Type I and Type II errors are tracked with separate counters. Two arrays are used to store error counts for each region of a grid.

For the feedback loop to work correctly, historical data cannot be collected ad infinitum. A given historical range must be used; data older than a certain maximum age is discarded (step 130). The shorter the historical range, the more "responsive" the feedback loop is, but a set minimum range is advantageous to provide a damping effect to the loop.

The tallying process may be a batch process run daily or on some other time schedule. Alternatively the tallying process may be done in real time.

Figure 2:
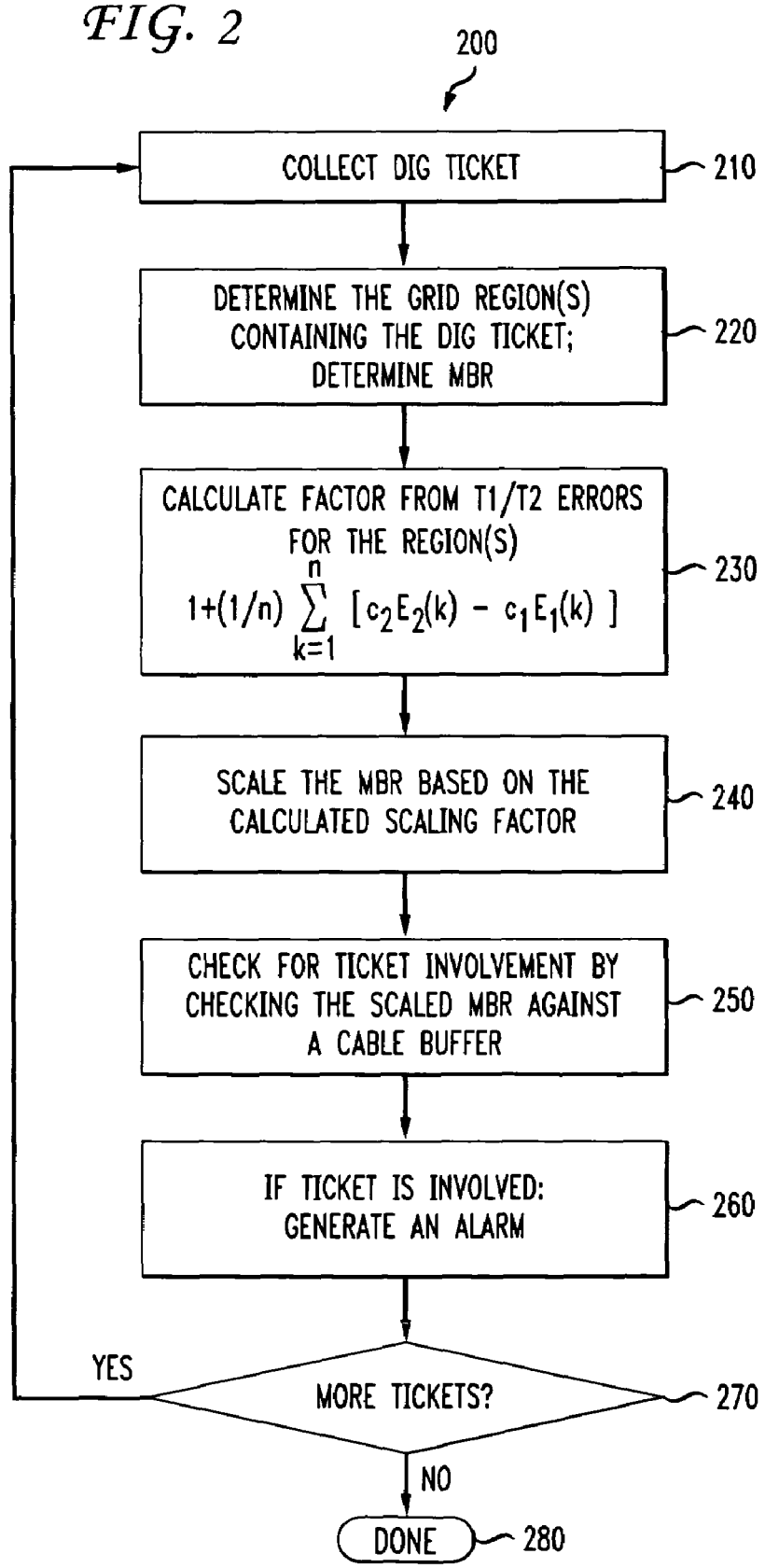
FIG. 2 is a flow chart depicting a method for screening ticket involvement according to one embodiment of the invention.

FIG. 2 is a flow chart depicting a process for screening ticket involvement according to one embodiment of the invention. Once a sufficient quantity of historical data is collected, the data is used to influence subsequent dig ticket screening in the following manner. The ticket is initially collected (step 210) for analysis. A ticket is "geocoded" by translating the location information contained on the ticket to map coordinates (step 220) and a "maximum bounding rectangle" (MBR) is constructed around the dig location. Points within the MBR satisfy the location information on the ticket in that each point is a member of the set of points described by the location information. The location information may be an address, a building identification, a lot number, or geographical information. In this step, that information is translated as accurately as possible to a map coordinate point. The MBR being a bounded zone, is a polygonal area surrounding the coordinate point and identifying the smallest known area in which the ticket must lie. The initial size of the MBR may depend on the type of information contained in the location information. In one embodiment, a rectangle is used. When dealing with dig tickets, this MBR is sometimes termed a "dig box".

An error scaling factor is computed (step 230) for the MBR using the historical data for the relevant region or regions. If the MBR intersects more than one region of the grid network, then the scaling factor is averaged over all the relevant regions using the error counts for each of those areas.

The metrics for Type I and Type II errors are combined by means of weighting coefficients. Type II errors are substantially more expensive, and in a preferred embodiment are weighted far higher than Type I errors. The following summation is used to compute a scaling factor for the MBR, taking into account error counts $E_1$ and $E_2$ from n grid locations:

$$1 + (1/n) \sum_{k=1}^{n} [c_2 E_2(k) - c_1 E_1(k)]$$

Where $c_1$ and $c_2$ are the weighting coefficients for Type I and Type II errors respectively, $E_1(k)$ and $E_2(k)$ are the error counts for each error type for the region k, and n is the total number of relevant grid regions; i.e. regions that intersect the ticket MBR. The resultant scalar value is used as a scaling factor for the existing MBR 240.

The coefficients $c_1$ and $c_2$ may be selected based on the relative costs of Type I and Type II errors. For example, a Type II error may be said to have an expected cost of $1,000, if an estimated average cable cut cost of $100,000 and there is a 1% chance of a missed ticket causing a cut. Similarly, a Type I error may be said to have an expected cost of $10, where $10 is the labor cost of manually screening that ticket. Type II errors would therefore be 100 times more expensive than Type I errors. The coefficients would be set accordingly. The algorithm balances each risk, increasing one at the expense of the other, in such a manner that overall costs are minimized.

A scaling factor greater than 1 indicates the presence of more Type II errors from tickets improperly screened and resulting in a classification of "not involved". Such a scaling factor results in MBR expansion. The expanded MBR is then used to determine whether a ticket is "involved" or not (step 250). Conversely, a scaling factor less than 1 indicates the presence of more Type I errors, and results in a shrinking of ticket dig boxes. This results in each ticket intersecting a smaller geographic area, which reduces the error count accordingly.

Classifying a dig ticket as either "involved" or "not involved" is done by comparing the scaled MBR with a cable buffer and checking for touching or overlapping. A cable buffer is an area surrounding a presumed underground cable location. The cable buffer takes into consideration the possible location errors in the cable location data, and defines a statistically likely corridor in which the cable lies.

A scaling factor greater than 1 results in expansion of the MBR, exerting a downward pressure on Type II errors, as a larger dig box has a higher probability of intersecting a cable buffer. This forms a negative feedback loop, as an increase in Type II errors for any given area results in a scaling factor that increases monotonically until error counts begin to decrease.

In another embodiment of the invention, threshold values $t_1$, $t_2$ are used to increase stability of the system:

$$1 + (1/n) \sum_{k=1}^{n} [c_2 \mathrm{Max}(E_2(k) - t_2, 0) - c_1 \mathrm{Max}(E_1(k) - t_1, 0)]$$

In that case, the error counts $E_1$, $E_2$ are considered only if they exceed a given threshold value. This would be useful in a case where one desires a certain amount of nonlinear response in the model. For instance, a company might consider "acceptable" performance to be 200 Type I errors/month and 1 Type II error/month for any given region. If the thresholds $t_1$, $t_2$ are set at 200 and 1 respectively, then any error counts below this cause no change whatsoever and only the errors which exceed these fixed thresholds will have any effect.

An alarm is generated (step 260) if a ticket is found to be involved. This method is repeated to automatically screen each dig ticket (step 270).

Figure 3:
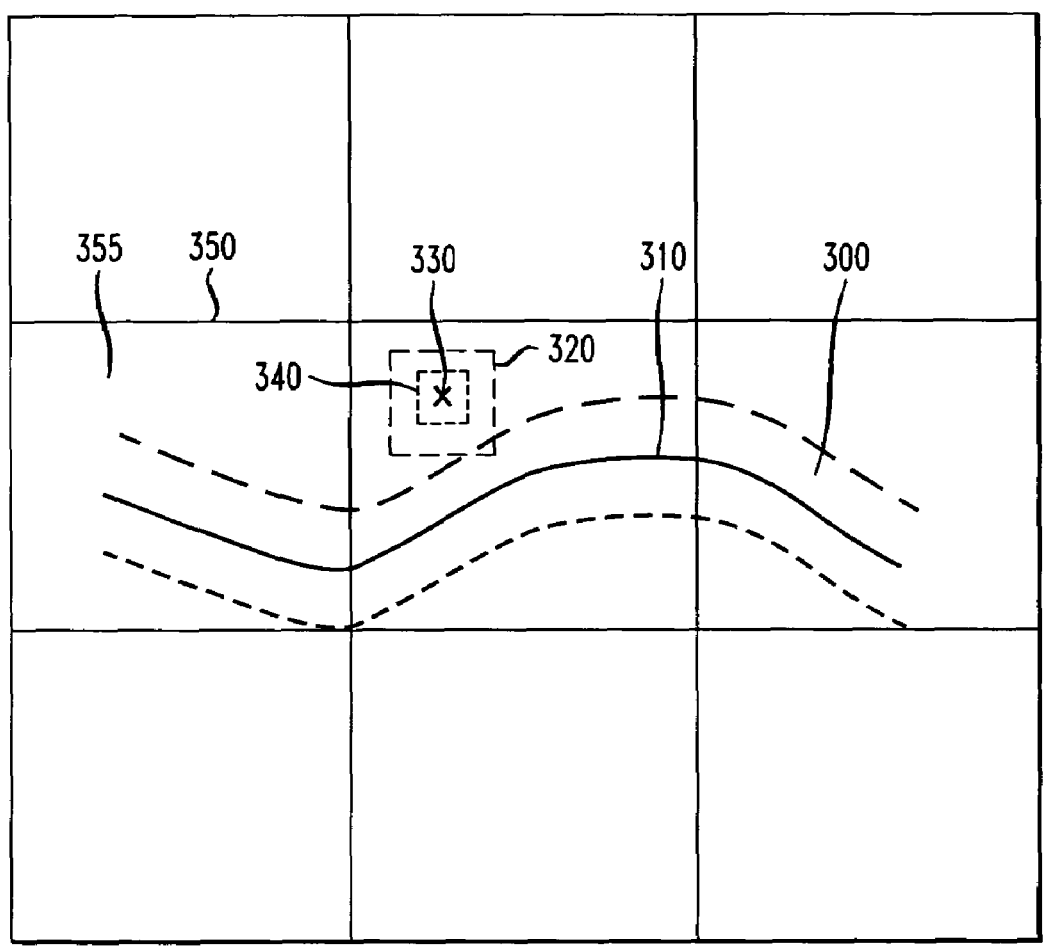
FIG. 3 is a schematic representation depicting a dig request ticket site according to one embodiment of the invention.

FIG. 3 is a schematic representation depicting a dig request ticket site according to one embodiment of the invention. The regions are small uniform areas in a matrix in the illustrated embodiment. A geographic area containing a buried asset such as the fiber 310 is divided into a plurality of regions 355 by a grid 350.

Coordinates of a dig request location are depicted by the "X" 330. The dig request location coordinates are from a dig ticket that is to be classified as "involved" or "not involved". A buried fiber 310 runs through several grid regions and is surrounded by a cable buffer 300. A rectangle 340 surrounding the dig request location 330, is the default MBR for the site. The larger rectangle 320 surrounding the MBR 340 is a scaled MBR resulting from a scaling factor greater than 1, indicating the presence of Type II errors, and so increasing the size of the original MBR 340.

If the scaled MBR 320 overlaps any portion of the cable buffer 300, then the ticket is considered "involved" and an alarm is generated. In the illustrated example, the initial smaller MBR 340 is separate from and does not touch the cable buffer 300. The scaled MBR 320, however, extends into and overlays the cable buffer 300 and so is flagged as too close to the cable, and an alarm is generated.

The method of the invention provides a new screening model to manage automated computer screening of outside plant protection tickets, through the use of negative feedback to control minimum and maximum error rates. This method enables underground utility providers to better protect their assets and maintain uninterrupted service by automatically adjusting the sensitivity of a system for screening large numbers of dig tickets.

The method furthermore reduces the need for real-time human field service support. It requires no special knowledge of the field service personnel; for example, field service personnel do not need to understand or manage TYPE I or TYPE II errors or how to determine the size of the dig box or the GIS application. The method greatly reduces the time required to identify "involved" dig alerts for further analysis.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to managing dig alerts with respect to an underground utility plant, the method may be used with any spatial classification system in which the occurrence of location errors is geographically correlated. Thus, the methods of the invention may be used with surface systems or even aviation or space applications. It is to be understood that the embodiments shown and described herein are only illustrative of the principles of the present invention and that various modifications may be implemented by those skilled in the art without departing from the scope and spirit of the invention.

What is claimed is:

1. A method for screening dig request alerts in an underground plant protection system, to identify involved dig requests, the method comprising the steps of:

collecting, by an automated computer, historical error data containing dig request screening, by an automated computer, errors and containing geographical locations of those errors;

receiving, by an automated computer, a dig request alert containing location information of a planned excavation;

determining, by an automated computer, a bounded zone containing locations satisfying the location information;

scaling, by an automated computer, the bounded zone based on the historical error data that contains geographical locations in a same geographical region as the dig request location information; and if the scaled bounded zone overlaps an underground plant buffer zone, then identifying, by an automated computer, the dig alert as involved.

2. The method of claim 1, wherein the step of collecting historical error data further comprises:

associating each screening error with one of a plurality of geographical regions; and incrementing a counter associated with the one geographical region.

3. The method of claim 2, wherein the geographical regions are delineated by a rectangular grid.

4. The method of claim 2, wherein the step of collecting historical error data further comprises:

determining whether each screening error is a Type I error or a Type II error; and wherein the counter is further associated with the determined error type.

5. The method of claim 4, wherein the step of scaling the bounded zone further comprises using predetermined weighting coefficients to assign relative weights to counter values for Type I and Type II errors.

6. The method of claim 4, wherein the step of scaling the bounded zone further comprises:

determining a scaling factor $$1 + \frac{1}{n}\sum_{k=1}^{n}(c_2 E_2(k) - c_1 E_1(k))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, and $E_2(k)$ is a value of the counter for Type II errors for geographical region k; and scaling the bounded zone using the scaling factor.

7. The method of claim 4, wherein the step of scaling the bounded zone further comprises using predetermined thresholds to assign minimum values for Type I and Type II error counts below which such errors are not considered.

8. The method of claim 4, wherein the step of scaling the bounded zone further comprises:

determining a scaling factor $$1 + \frac{1}{n}\sum_{k=1}^{n}(c_2 \max(E_2(k) - t_2, 0) - c_1(E_1(k) - t_1, 0))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, $E_2(k)$ is a value of the counter for Type II errors for geographical region k; $t_1$ is a threshold value for the Type I error counter, and $t_2$ is a threshold value for the Type II error counter; and scaling the bounded zone using the scaling factor.

9. The method of claim 1, wherein the step of determining from the location information a bounded zone in which the planned excavation lies, further comprises:

converting the location information into a point having geographical coordinates; and constructing a box surrounding the point, the box containing possible locations of the point that satisfy the location information.

10. The method of claim 1, wherein the step of identifying the dig alert as involved, further comprises:

generating an alarm identifying the dig request alert.

11. A computer-usable medium having computer readable instructions stored thereon for execution by a processor to perform a method for screening dig request alerts in an underground plant protection system, to identify involved dig requests, the method comprising the steps of:

collecting, by said computer-usable medium, historical error data containing dig request screening, by said computer-usable medium, errors and containing geographical locations of those errors;

receiving, by said computer-usable medium, a dig request alert containing location information of a planned excavation;

determining, by said computer-usable medium, a bounded zone containing locations satisfying the location information;

scaling, by said computer-usable medium, the bounded zone based on the historical error data that contains geographical locations in a same geographical region as the dig request location information; and if the scaled bounded zone overlaps an underground plant buffer zone, then identifying, by said computer-usable medium, the dig alert as involved.

12. The computer-usable medium of claim 11, wherein the step of collecting historical error data further comprises:

associating each screening error with one of a plurality of geographical regions; and incrementing a counter associated with the one geographical region.

13. The computer-usable medium of claim 12, wherein the geographical regions are delineated by a rectangular grid.

14. The computer-usable medium of claim 12, wherein the step of collecting historical error data further comprises:

determining whether each screening error is a Type I error or a Type II error; and wherein the counter is further associated with the determined error type.

15. The computer-usable medium of claim 14, wherein the step of scaling the bounded zone further comprises using predetermined weighting coefficients to assign relative weights to counter values for Type I and Type II errors.

16. The computer-usable medium of claim 14, wherein the step of scaling the bounded zone further comprises:

determining a scaling factor $$1 + \frac{1}{n}\sum_{k=1}^{n}(c_2 E_2(k) - c_1 E_1(k))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, and $E_2(k)$ is a value of the counter for Type II errors for geographical region k, and scaling the bounded zone using the scaling factor.

17. The computer-usable medium of claim 14, wherein the step of scaling the bounded zone further comprises using predetermined thresholds to assign minimum values for Type I and Type II error counts below which such errors are not considered.

18. The computer-usable medium of claim 14, wherein the step of scaling the bounded zone further comprises:

determining a scaling factor $$1 + \frac{1}{n}\sum_{k=1}^{n}(c_2 \max(E_2(k) - t_2, 0) - c_1(E_1(k) - t_1, 0))$$

wherein n is a number of geographical regions overlapped by the bounded zone, $c_1$ is a weighting coefficient for Type I errors, $c_2$ is a weighting coefficient for Type II errors, $E_1(k)$ is a value of the counter for Type I errors for geographical region k, $E_2(k)$ is a value of the counter for Type II errors for geographical region k; $t_1$ is a threshold value for the Type I error counter, and $t_2$ is a threshold value for the Type II error counter; and scaling the bounded zone using the scaling factor.

19. The computer-usable medium of claim 11, wherein the step of determining from the location information a bounded zone in which the planned excavation lies, further comprises:

converting the location information into a point having geographical coordinates; and constructing a box surrounding the point, the box containing possible locations of the point that satisfy the location information.

20. The computer-usable medium of claim 11, wherein the step of identifying the dig alert as involved, further comprises:

generating an alarm identifying the dig request alert.

* * * * *